United States Patent Office 3,646,067
Patented Feb. 29, 1972

3,646,067
ADAMANTYLAMINOPHENOXYPROPANOLS AND ESTER DERIVATIVES
Venkatachala L. Narayanan, North Brunswick, and Jack Bernstein, New Brunswick, N.J., assignors to E. R. Squibb & Sons, Inc., New York, N.Y.
No Drawing. Filed July 23, 1970, Ser. No. 57,791
Int. Cl. C07c 93/00, 93/26
U.S. Cl. 260—343.7         13 Claims

ABSTRACT OF THE DISCLOSURE

This invention relates to new adamantylaminophenoxypropanols and related compounds of the formula:

$$(X)_n-\text{C}_6\text{H}_{4-n}-O-\overset{R^5}{\underset{R^6}{C}}-CH(R^4)-CH(R^3)-N(R^1)-(CH_2)_m-\text{Adamantyl}-R^2$$
(with $OR^7$ on the central carbon)

and to salts of such compounds, products which are useful in coronary diseases and as antiviral agents. In addition, such compounds are useful in water softening and corrosion inhibition.

SUMMARY OF THE INVENTION

This invention relates to new chemical compounds of the formula:

(I)

$$(X)_n-\text{C}_6\text{H}_{4-n}-O-\overset{R^5}{\underset{R^6}{C}}-CH(R^4)-CH(R^3)-N(R^1)-(CH_2)_m-\text{Adamantyl}-R^2$$
(with $OR^7$ on the central carbon)

wherein $R^1$ and $R^2$ each is hydrogen, lower alkyl or lower alkoxy, $R^3$ is hydrogen, lower alkyl, hydroxy-lower alkyl, lower alkenyl or phenyl-lower alkyl, $R^4$, $R^5$ and $R^6$ each is hydrogen or lower alkyl, $R^7$ is hydrogen or the acyl radical of a hydrocarbon carboxylic acid of less than 14 carbon atoms, X is nitro, amino, substituted amino, hydroxy, halogen, cyano, lower alkyl, lower alkoxy, cycloalkyl, lower alkenyl or aralkyl and $m$ is 0, 1 or 2, $n$ is 0, 1 or 2, and salts of those compounds.

DETAILED DESCRIPTION OF THE INVENTION

In Formula I, the lower alkyl groups represented by the various symbols include straight and branched chain saturated hydrocarbon groups such as methyl, ethyl, propyl, isopropyl, butyl, isobutyl, t-butyl, amyl, and the like. The lower alkenyl groups are monounsaturated radicals of the same type. The lower alkoxy groups are oxygen containing radicals of the same character, e.g., methoxy, ethoxy, propoxy, isopropoxy, and the like. The phenyl-lower alkyl groups also include similar alkyl groups, e.g., benzyl, phenethyl, and the like.

The substituted amino groups include mono- or di-lower alkyl amino groups, wherein lower alkyl is as defined above, such as methylamino, ethylamino, isopropylamino, heptylamino, dimethylamino, diethylamino, methylethylamino, methylbutylamino and ethyl-isopropylamino.

The term "cycloalkyl" includes monocyclic radicals containing from 3 to 6 ring members such as cyclopropyl, cyclobutyl, cyclopentyl or cyclohexyl.

The term "aralkyl" encompasses lower alkyl radicals containing a monocyclic aryl substituent such as a phenyl radical, for example, benzyl, phenethyl, and the like.

The term "halogen" includes chlorine, bromine and iodine.

The acyl radicals represented by $R^7$ include lower fatty acid radicals, e.g., acetyl, propionyl, isobutyryl, butyryl, as well as long chain fatty acid radicals such as hexanoyl, heptanoyl, decanoyl, dodecanoyl, and the like, aryl, aralkanoic acid radicals such as benzoyl, phenacetyl, and the like, and 1-adamantane carbonyl and adamantanealkanoyl radicals.

As indicated, the adamantyl ring may be unsubstituted or contain one or two substituents of the type described. The adamantane ring may be joined directly to the nitrogen atom or through a one or two carbon atom chain.

The various substituents R may be same or different in a given compound.

The compounds of Formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic or organic acid. Illustrative are the hydrohalides, especially the hydrochloride and hydrobromide which are preferred, sulfate, nitrate, phosphate, borate, acetate, oxalate, tartrate, maleate, citrate, succinate, benzoate, ascorbate, salicylate, lactate, methanesulfonate, benzenesulfonate, toluenesulfonate, and the like.

Preferred are those compounds wherein $R^1$, $R^2$, $R^3$, $R^4$, $R^5$ and $R^6$ are all hydrogen, $R^7$ is hydrogen or acetyl and $m$ and $n$ are 0.

Examples of compounds falling within the present invention include, but are not limited to, the following:

1. Phenyl-O-CH$_2$-CH(OH)-CH$_2$-NH-adamantyl

2. $O_2N$-C$_6$H$_4$-O-C(CH$_3$)(H)-CH(OH)-CH$_2$-NH-adamantyl

3. $H_2N$-C$_6$H$_4$-O-CH$_2$-CH(OCOCH$_3$)-CH(C$_2$H$_5$)-N(CH$_3$)(CH$_2$-adamantyl-CH$_3$)

4. $H_5C_2$-C$_6$H$_3$(CH$_3$)-O-CH$_2$-CH(CH$_3$)-CH(OH)-N(CH$_2$CH$_2$OH)(CH$_2$CH$_2$-adamantyl-OCH$_3$)

5. NC-C$_6$H$_4$-O-CH$_2$-CH(OH)-CH$_2$-N(CH$_3$)(adamantyl with CH$_2$CH=CH$_2$ and CH$_3$)

6. CH$_3$-C$_6$H$_4$-O-C(CH$_3$)(H)-CH(OH)-CH$_2$-N(CH$_2$-adamantyl)(phenyl)

7.
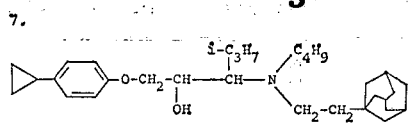

8.
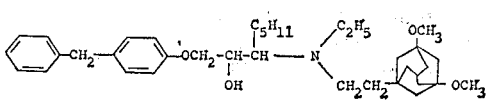

9.
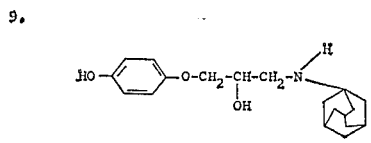

10.
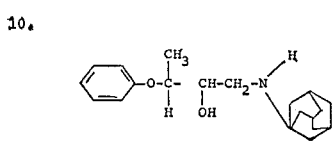

11.
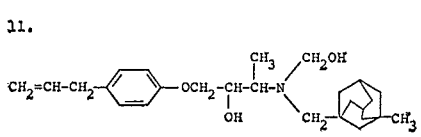

12.
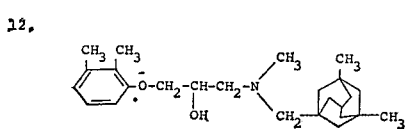

13.
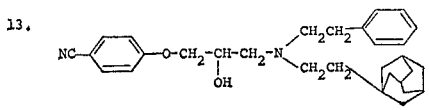

14.
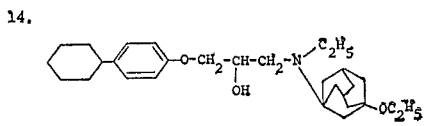

15.
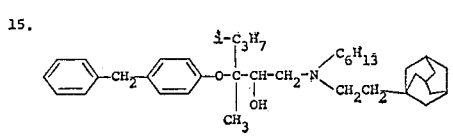

16.
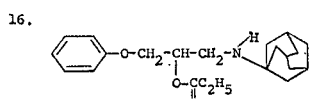

The compounds of this invention are useful as antiviral agents in warm-blooded animals, like household animals, e.g., against influenza virus such as A–PR8 or hepatic virus such as MHV$_3$, by oral or parenteral, e.g., i.p. administration at doses of about 10 to 90 mg./kg./day divided in four to six doses. For example, in mice about 15 mg./kg./day, orally, are used. For this purpose, a compound of Formula I or a physiologically acceptable acid-addition salt may be incorporated in a conventional dosage form such as tablet, capsule, elixir, injectable, or like, along with the necessary carrier material, excipient, lubricant, buffer, or the like.

They are also useful as antifibrillatory agents, for example, in arresting cardiac arrhythmia in warm-blooded animals, e.g., by inhibition of beta adrenergic receptors in the myocardium. Single or divided doses of about 5 to 25 mg./kg./day, preferably 5 to 10 mg./kg., two to four times daily may be administered in dosage forms as described above. They are also useful as antihypertensive agents, e.g., at 10 mg./kg., i.p. in the rat.

The products of Formula I may be produced by one of several methods described below. The symbols have the same meanings described above.

The adamantylamino-phenoxypropanols of the structure:

II
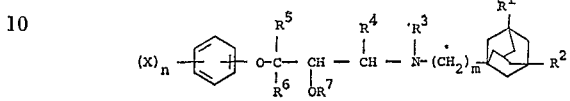

are prepared by reacting a phenol of the structure:

IV
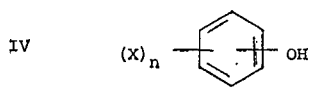

with an epoxide of the structure:

V
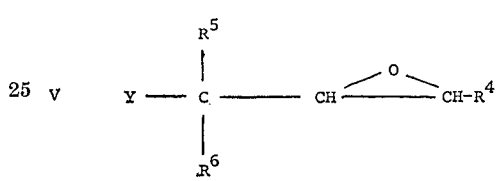

(Y is chlorine or bromine), to obtain a product of the formula:

VI
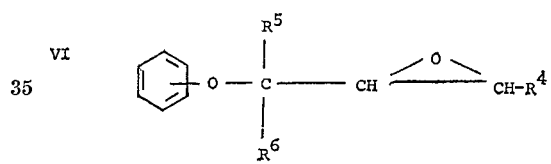

By refluxing the compound of Formula VI with an unsubstituted or substituted adamantylamine of the formula:

VII
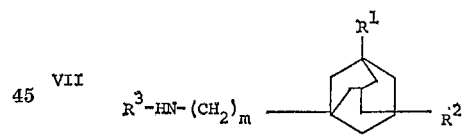

in an inert organic solvent such as n-propanol, benzene or toluene, e.g., for about 16 to 24 hours, yields a product of Formula I wherein R$^7$ is hydrogen. The ester, i.e., wherein R$^7$ is acyl, is obtained by esterifying the product of the foregoing procedure with the appropriate hydrocarbon carboxylic acid, e.g., by refluxing the alcohol (Formula I wherein R$^7$=H) with the appropriate acid in a solvent like methylene or ethylene chloride using a trace of sulfuric, aryl sulfonic acid or borontrifluoride as catalyst. In an alternate procedure, the alcohol is heated with the appropriate acid chloride or acid anhydride (obtained from the appropriate hydrocarbon carboxylic acid) in the presence of anhydrous pyridine or sodium acetate.

Examples of such acids include acetic acid, propionic acid, isobutyric acid, hexanoic acid, decanoic acid, benzoic acid, phenylacetic acid, 1-adamantane, carboxylic acid, 3-methyl-1-adamantaneacetic acid, etc.

The acid-addition salts may be formed as previously described.

As an alternate method, an adamantylamine of Formula VII is reacted with a compound of the formula:

VIII
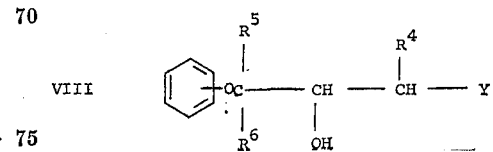

(Y is a halogen, preferably bromine), e.g., by refluxing two equivalents of the compound of Formula VII with one equivalent of VIII in an organic solvent such as chloroform, benzene, toluene, or dimethoxyethane for about 6 to 10 hours.

The compounds of Formula VIII are prepared by reacting compounds of Formula VI with a hydrohalic acid, for example, hydrobromic acid.

Adamantylamines of Formula VII may be produced by several methods. When $m$ is 0 and $R^3$ is hydrogen, unsubstituted and substituted adamantylamines of the formula:

IX 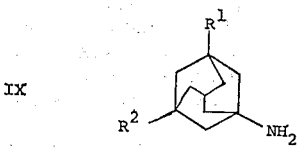

are known, e.g., 1-adamantylamine, 3-methyl-1-admantylamine, 3 - ethyl - 1 - adamantylamine, 3 - methoxy-1-adamantylamine, 3,5-dimethyl-1-adamantylamine, 3,5-dimethoxy-1-adamantylamine, and the like, and may be prepared by known methods. When $m$ is 0 and $R^3$ is other than hydrogen, they may be prepared from unsubstituted or substituted adamantylamines of Formula IX by refluxing the latter with an acid chloride RCOCl or an acid anhydride $(RCO)_2O$. The product of the formula:

X 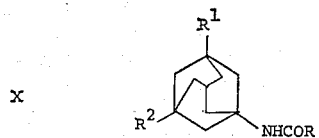

is refluxed in a solvent such as tetrahydrofuran in the presence of a reducing agent such as lithium aluminum hydride to obtain a product of the formula:

XI 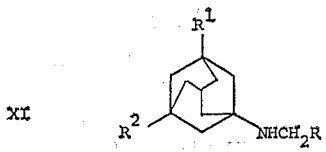

The radical $CH_2R$ is the same as $R^3$

When $m$ is one, an unsubstituted or substituted adamantanecarboxylic acid, e.g., 1-adamantanecarboxylic acid, 3 - methyl-1-adamantanecarboxylic acid, 3-ethyl-1-adamantanecarboxylic acid, 3-methoxy-1-adamantanecarboxylic acid, 3,5-dimethoxy-1-adamantanecarboxylic acid, or the like, is converted to the corresponding acid chloride in benzene to obtain a compound of the formula:

XI 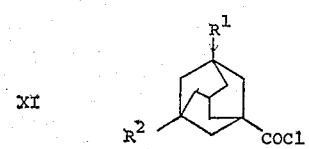

The latter is treated with an amine $R^3$—$NH_2$ to obtain the amide

XII 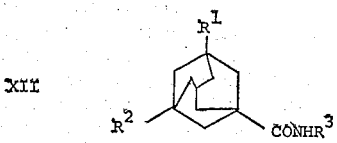

Upon reduction with lithium aluminum hydride in tetrahydrofuran, there is obtained:

XIII 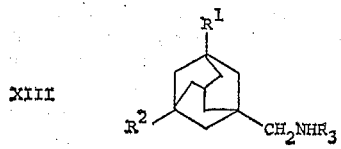

When $m$ is 2, an unsubstituted or substituted 1-bromoadamantane of the formula:

XIV 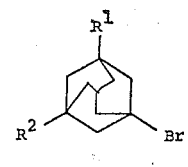

is treated with dichloroethylene and boron trifluoride in an acid such as sulfuric acid to obtain a 1-adamantaneacetic acid of the formula:

XV 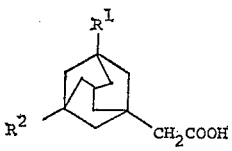

This acid is then processed as described above when $m$ is 1 to give:

XVI 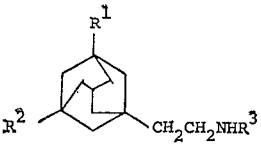

The following examples are illustrative of the invention. All temperatures are on the centigrade scale.

EXAMPLE 1

1-(1-adamantylamino)-3-(1-phenoxy)-2-propanol (a) 1-(2,3-epoxypropoxy)benzene.—To a cooled solution of 47 g. (0.5 mole) of phenol and 64 g. (0.7 mole) of epichlorohydrin in 200 ml. of p-dioxane, a solution of 24 g. (0.6 mole) of sodium hydroxide in 50 ml. of water is added dropwise. The mixture is refluxed for three hours. After cooling, the solvent is removed in vacuo, and the residue extracted with benzene. The extracts are combined, washed with water and dried (MgSO$_4$). The residue obtained after removing the solvent is distilled in vacuo to give 1-(2,3-epoxypropoxy)benzene.

(b) 1 - (1 - adamantylamino)-3-(1-phenoxy)-2-propanol.—A solution of 2.25 g. (0.015 mole) of 1-(2,3-epoxypropoxy)-benzene and 2.25 g. (0.015 mole) of 1-aminoadamantane in 100 ml. of toluene is refluxed for 16 hours. Evaporation of the solvent in vacuo gives a thick liquid which solidifies on trituration with dry ether to give 1-(1-adamantylamino)-3-(1-phenoxy)-2-propanol.

(c) 1 - (1 - adamantylamino) - 3 - (1-phenoxy)-2-propanol.—Alternate method—from 1-chloro - 3 - (1-phenoxy)-2-propanol: A solution of 2.8 g. (0.015 mole) of 1-chloro-3-(1-phenoxy) - 2 - propanol and 4.5 g. (0.03 mole) of 1-aminoadamantane in 20 ml. of benzene is refluxed for 16 hours. The solvent is removed in vacuo, basified and extracted with chloroform. The residue obtained after removal of chloroform is crystallized from ether to give 1-(1-adamantylamino) - 3 - (1-phenoxy)-2-propanol.

Following the procedure of Example 1, but substituting for the phenol of part a, the substituted phenol indicated in the first column of the table below and using the 1-aminoadamantane indicated in the second column, there is obtained 1-[3-R$^1$, 5-R$^2$-(1-adamantylamino)]-3-[(X)$_n$-1(or 2)-phenoxy)] - 2 - propanol wherein (X)$_n$, R$^1$ and R$^2$ represent the substituents on the phenyl and adamantyl rings, respectively.

| Example | phenol | 1-aminoadamantane |
| --- | --- | --- |
| 2 | 4-bromophenol | 1-aminoadamantane. |
| 3 | 2-chlorophenol | Do. |
| 4 | 4-methylphenol | Do. |
| 5 | 2,3-dimethylphenol | Do. |
| 6 | 3-methoxyphenol | Do. |
| 7 | 4-cyanophenol | Do. |
| 8 | 4-propenylphenol | Do. |
| 9 | 3,5-dimethylphenol | Do. |
| 10 | 5,6-dichlorophenol | Do. |
| 11 | 3-nitrophenol | Do |
| 12 | 4-methylaminophenol | Do. |
| 13 | 3-cyclopropylphenol | Do. |
| 14 | 3-benzylphenol | Do. |
| 15 | 2-aminophenol | 1-amino-3-methyladamantane. |
| 16 | 3-hydroxyphenol | 1-amino-3-methoxyadamantane. |
| 17 | Phenol | 1-amino-3,5-diethyladamantane. |

Each of the propanols of Examples 2 to 17 is esterified with acetic anhydride, propionic acid, decanoic acid and phenylacetic acid, respectively, as described in Example 18 below, to obtain the acetic acid ester, propionic acid ester, decanoic acid ester and phenylacetic acid ester of each.

EXAMPLE 18

1-(1-adamantylamino)-3-(1-phenoxy)-2-propyl acetate

A mixture of 3 g. of 1-(1-adamantylamino)-3-(1-phenoxy)-2-propanol, 1.5 g. of fused sodium acetate and 15 ml. of acetic anhydride is heated on a steam bath, with occasional shaking for 1 hour. At the end of this time the warm solution is poured, with vigorous stirring, into 100 ml. of ice water. The mixture is stirred for 10–15 minutes and the crystals are collected, washed thoroughly with water, and purified by recrystallization from alcohol.

EXAMPLES 19 TO 23

Following the procedure of Example 1, but substituting for the 1-(2,3-epoxypropoxy)benzene in part b, the substituted compound of the following formula, there is obtained the substituted 1 - (1 - adamantylamino)-3-(1-phenoxy) - 2 - propanol having the same substituents $R^3$, $R^4$, $R^5$ and $R^6$:

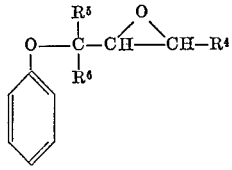

| | $R^4$ | $R^5$ | $R^6$ |
| --- | --- | --- | --- |
| Example: | | | |
| 19 | H | CH$_3$ | CH$_3$ |
| 20 | H | C$_2$H$_5$ | H |
| 21 | CH$_3$ | H | H |
| 22 | CH$_3$ | CH$_3$ | CH$_3$ |
| 23 | CH$_3$ | C$_2$H$_5$ | H |

By utilizing the ring substituted phenols of Examples 2 to 6, respectively, to prepare the compounds of Examples 19 to 23, respectively, the corresponding $R^4$, $R^5$, $R^6$ substituted products of Formula I are obtained.

EXAMPLE 24

1-(1-adamantylmethylamino)-3-(1-phenoxy)-2-propanol (a) 1-adamantane carboxylic acid chloride.—To 18 g. of 1-adamantane carboxylic acid, 50 ml. of thionyl chloride is added with cooling, and the mixture is heated under reflux for 30 minutes. The excess of thionyl chloride is removed in vacuo, the addition of 2× 30 ml. of benzene (benzene dried over silica gel) and evaporation serving to remove the last traces. Anhydrous ether (30 ml.) is added and the solution is evaporated, leaving 1-adamantanecarboxylic acid chloride as a brownish white solid;

$\lambda_{max.}^{Nujol}$ 5.61 m$\mu$ (c.=0 of acid chloride)

(b) 1 - adamantanecarboxamide.—1 - adamantanecarboxylic acid chloride (35 g.) dissolved in 70 ml. of dry tetrahydrofuran, is added to a well-cooled aqueous ammonia solution. A white precipitate appears and the mixture is then stirred for 0.5 hour. The precipitate is filtered, washed with water to neutrality and dried over phosphorus pentoxide in vacuo to give 1-adamantanecarboxamide; M.P. 186–187.5°.

$\lambda_{max.}^{Nujol}$ 5.95 m$\mu$ (c.=0 of amide)

(c) 1-adamantylmethylamine.—To a well stirred suspension of 30 g. of lithium aluminum hydride in 1000 ml. of dry ether, 27 g. (0.15 mole) of 1-adamantanecarboxamide is added in portions over a period of 1.5 hour. After the addition, the reaction mixture is stirred at room temperature for 1 hour and then is refluxed with stirring for 4 hours and finally is allowed to stand overnight at room temperature. The suspension is well cooled and 50 ml. of water is added dropwise with vigorous stirring. This is followed by the addition of 100 ml. of 10% sodium hydroxide solution. The ethereal layer is separated and the solid is extracted three times with ether. The combined ethereal layer is dried (MgSO$_4$) and evaporated in vacuo to give 1-adamantylmethylamine as a pale yellow liquid.

(d) 1-(1-adamantylmethylamino) - 3-(1-phenoxy)-2-propanol.—Following the procedure of Example 1, but substituting 1-adamantylmethylamine for the 1-aminoadamantane in part (b) or (c), 1-(1-adamantylmethylamino)-3-(1-phenoxy)-2-propanol is obtained.

Similarly by utilizing the following (3-$R^1$, 5-$R^2$-1-adamantyl)methylamine, produced as in parts (a), (b) and (c) above, instead of 1-adamantylmethylamine, the corresponding 1-(3-$R^1$, 5-$R^2$-1-adamantyl)methylamino-3-(1-phenoxy)-2-propanol is obtained.

| | $R^1$ | $R^2$ |
| --- | --- | --- |
| Example: | | |
| 25 | H | CH$_3$ |
| 26 | H | OCH$_3$ |
| 27 | C$_2$H$_5$ | C$_2$H$_5$ |
| 28 | OCH$_3$ | OCH$_3$ |
| 29 | H | C$_4$H$_9$ |
| 30 | CH$_3$ | CH$_3$ |

EXAMPLE 31

1-[N-ethyl-2-(1-adamantyl)ethylamino]-3-(1-phenoxy)-2-propanol (a) 1-adamantaneacetic acid.—A solution of 25 g. of 1-bromoadamantane in 100 g. of dichloroethylene is added dropwise during 1.5 hour to 100 ml. of sulfuric acid (90%) containing 18 g. of boron trifluoride at 8–10°. After stirring for 3 hours at 10°, crushed ice is gradually added, and the mixture is diluted with water. The crude precipitate (26.5 g.) is dissolved in 10% sodium hydroxide solution, and the cloudy solution is extracted once with ether. The basic solution is cooled, and acidified with 5% hydrochloric acid. The 1-adamantaneacetic acid that precipitates is collected and dried to give 21.5 g. of white solid, M.P. 130–133°. The analytical sample crystallizes from methanol-water as long white needles, M.P. 134–136°.

(b) 1-adamantaneacetic acid chloride.—To 39 g. of 1-adamantaneacetic acid, 100 ml. of thionyl chloride is added with cooling, and the mixture is heated under reflux for 0.5 hour. The excess of thionyl chloride is removed in vacuo, the addition of 2× 50 ml. of dry benzene and evaporation serving to remove the last traces, yielding 1-adamantaneacetic acid chloride, $\lambda_{max.}^{Nujol}$ 5.6 m$\mu$ (c) 1-adamantaneacetamide.—A solution of 1-adamantaneacetic acid chloride (40 g.) dissolved in 75 ml. of dry tetrahydrofuran, is added to a well-cooled aqueous ammonia solution. A white precipitate appears and the mixture is then stirred for 0.5 hour. The precipitate is filtered, washed with water to neutrality, and dried over phosphorus pentoxide in vacuo to give 1-adamantane-acetamide as white crystals, M.P. 166–168°;

$\lambda_{max.}^{Nujol}$ 5.9 m$\mu$ (d) 1-adamantaneethylamine.—To a well-stirred suspension of 20 g. of lithium aluminum hydride in 500 ml. of dry tetrahydrofuran, 35 g. of 1-adamantaneacetamide dissolved in 1000 ml. of dry tetrahydrofuran is added in portions over a period of 1.5 hour. After the addition, the reaction mixture is stirred at room temperature for 1 hour, and then refluxed with stirring for 4 hours, and finally is allowed to stand overnight at room temperature. The suspension is well-cooled and 50 ml. of water is added dropwise with vigorous stirring. This is followed by the addition of 100 ml. of 10% sodium hydroxide solution. The organic layer is separated and the solid is extracted three times with ether. The combined organic layer is dried (MgSO$_4$) and evaporated in vacuo to give 24 g. of 1-adamantaneethylamine as a pale yellow liquid. It may be identified as its hydrochloride which separates as white crystals from methanol-ether, M.P. over 280°.

(e) N-[2-(1-adamantyl)ethyl]acetamide.—To a solution of 5 g. of 1-adamantaneethylamine in 100 ml. of benzene and 2.5 g. of pyridine, 2.4 g. of acetyl chloride is added dropwise with cooling. After refluxing for 0.5 hour, the mixture is poured onto 100 ml. of cold water, and the benzene layer is separated. The aqueous layer is extracted once with benzene, and the combined benzene layer is washed successively with water, 5% sodium carbonate solution, 1 N hydrochloric acid, and water. After drying, the benzene layer is evaporated in vacuo to give a thick oil. Trituration with pentane yields N-[2-(1-adamantyl)ethyl]acetamide as a white solid, M.P. 100–103°. An analytical sample is obtained by two crystallizations from ether, M.P. 114–116°.

(f) N-ethyl-1-adamantaneethylamine.—Using the procedure of part d above, but substituting N-[2-(1-adamantyl)ethyl]acetamide for 1-adamantaneacetamide, N-ethyl-1-adamantaneethylamine is obtained. It may be identified as its hydrochloride, which separates as white crystals from acetonitrile, M.P. over 280°.

(g) 1-(N - ethyl - 1 - adamantylethylamino)-3-(1-phenoxy)-2-propanol.—Following the procedure of Example 1, but substituting N-ethyl-1-adamantylethylamine for the aminoadamantane in part (b) or (c) 1-(N-ethyl-1-adamantylethylamine)-3-(1-phenoxy)-2-propanol is obtained.

Similarly, by utilizing the following substituted 3-R$^1$, 5-R$^2$-1-bromoadamantanes in place of 1-bromoadamantane in part a above and continuing as described, the correspondingly substituted 1-[N-ethyl-2-(3-R$^1$, 5-R$^2$-1-adamantyl)ethylamino]-3-(1-phenoxy)-2-propanol is obtained.

| Example: | R$^1$ | R$^2$ |
|---|---|---|
| 32 | H | CH$_3$ |
| 33 | H | OCH$_3$ |
| 34 | C$_2$H$_5$ | C$_2$H$_5$ |
| 35 | OCH$_3$ | OCH$_3$ |
| 36 | H | C$_4$H$_9$ |
| 37 | CH$_3$ | CH$_3$ |

EXAMPLE 38

1-(1-adamantylamino)-3-(1-phenoxy)-2-propanol hydrochloride

Dry HCl gas is introduced into a solution of 1 g. of 1-(1-adamantylamino)-3-(1-phenoxy)-2-propanol in 200 ml. of dry ether. The precipitate is collected and the hydrochloride is crystallized from alcohol-ether.

What is claimed is:
1. A compound of the formula:

$R^1$ and $R^2$ each is hydrogen, lower alkyl or lower alkoxy; $R^3$ is hydrogen, lower alkyl, hydroxy-lower alkyl, lower alkenyl or phenyl-lower alkyl; $R^4$, $R^5$ and $R^6$ each is hydrogen or lower alkyl; $R^7$ is hydrogen or the acyl radical of a hydrocarbon carboxylic acid of less than 14 carbon atoms, X is nitro, amino, mono or di-lower alkyl amino, hydroxy, cyano, lower alkoxy, halogen, lower alkyl, cycloalkyl having 3–6 carbon atoms, lower alkenyl or phenyl-lower alkyl and $m$ and $n$ are 0, 1 or 2, and acid addition salts thereof.

2. A compound as in claim 1 wherein $R^1$ to $R^6$ are all hydrogen, $m$ and $n$ are 0 and $R^7$ is lower alkanoyl.

3. A compound as in claim 1 wherein $R^1$ to $R^6$ are all hydrogen, $m$ is 1, $n$ is 0, and $R^7$ is lower alkanoyl.

4. A compound as in claim 1 wherein $R^1$ to $R^6$ are all hydrogen, $m$ is 2, $n$ is 0 and $R^7$ is lower alkanoyl.

5. A compound as in claim 1 wherein $R^2$ to $R^7$ are all hydrogen, $m$ is 0, $n$ is 0 and $R^1$ is lower alkyl.

6. A compound as in claim 1 wherein $R^1$ to $R^7$ are all hydrogen, $m$ is 0, and $n$ is 0.

7. Acid addition salt of the compound of claim 6.

8. A compound as in claim 7 wherein the salt is the hydrochloride.

9. A compound as in claim 1 wherein $R^1$ to $R^7$ are all hydrogen, $m$ is 1, and $n$ is 0.

10. A compound as in claim 1 wherein $R^1$, $R^2$, $R^4$ to $R^7$ are all hydrogen, $m$ is 2, and $R^3$ is ethyl.

11. A compound as in claim 2 wherein the lower alkanoyl group is acetyl.

12. A compound as in claim 1 wherein $R^1$, $R^2$, and $R^4$ to $R^7$ are all hydrogen, $R^3$ is $\beta$-hydroxyethyl, $m$ is 0, and $n$ is 0.

13. A compound as in claim 1 wherein $R^1$, $R^2$ and $R^4$ to $R^7$ are all hydrogen, $R^3$ is allyl, $m$ is 0 and $n$ is 0.

References Cited

UNITED STATES PATENTS

| 3,337,628 | 8/1967 | Crowther et al. | 260—570.7 |
| 3,415,873 | 12/1968 | Stevens | 260—501.18 |
| 3,432,545 | 3/1969 | Howe | 260—570.7 |
| 3,463,808 | 8/1969 | Bond | 260—490 |
| 3,476,767 | 11/1969 | Bencze | 260—570.7 |
| 3,538,150 | 11/1970 | Gilman et al. | 260—501.17 |
| 3,501,769 | 3/1970 | Crowther et al. | 260—501.17 |
| 3,520,919 | 7/1970 | Crowther et al. | 260—501.17 |

JAMES A. PATTEN, Primary Examiner

V. GARNER, Assistant Examiner

U.S. Cl. X.R.

252—175, 392; 260—348, 404, 465 D, 465 E, 468 B, 476 C, 490, 501.18, 501.19, 514 B, 544 R, 557 B, 561 R, 563 P, 570.5 CA, 570.7, 613 D; 424—199, 280, 308, 311, 312, 325